(12) United States Patent
Laitsaari et al.

(10) Patent No.: US 6,441,732 B1
(45) Date of Patent: Aug. 27, 2002

(54) SYSTEM FOR DISPLAYING TIRE CHARACTERISTICS

(75) Inventors: Juha M. T. Laitsaari; Jukka A. P. Hakanen, both of Tampere (FI)

(73) Assignee: Nokian Tyres PLC, Nokia (FI)

( * ) Notice: Subject to any disclaimer, the term of this patent is extended or adjusted under 35 U.S.C. 154(b) by 0 days.

(21) Appl. No.: 09/846,388

(22) Filed: May 2, 2001

(51) Int. Cl.[7] .............................................. C08B 1/08
(52) U.S. Cl. ...................... 340/539; 340/442; 340/447; 340/438; 73/146.2
(58) Field of Search ................................ 340/442, 447, 340/539, 438, 443, 444, 10.1, 10.41; 73/146.2

(56) References Cited

U.S. PATENT DOCUMENTS

| | | | | |
|---|---|---|---|---|
| 4,398,172 A | * | 8/1983 | Carroll et al. | 340/825.54 |
| 5,442,553 A | * | 8/1995 | Parrillo | 364/424.04 |
| 5,611,875 A | * | 3/1997 | Bachhuber | 152/415 |
| 5,952,568 A | * | 9/1999 | Bedell, Jr. | 73/146.5 |
| 6,065,511 A | * | 5/2000 | McClintock | 141/231 |
| 6,144,295 A | * | 11/2000 | Adams et al. | 340/442 |
| 6,340,930 B1 | * | 3/2001 | Lin | 340/447 |

* cited by examiner

Primary Examiner—Jeffery Hofsass
Assistant Examiner—Daniel Previl
(74) Attorney, Agent, or Firm—Louis Woo

(57) ABSTRACT

A vehicle depot such as for example a gas station, a bus stop or a truck terminal, is equipped with a communications system to receive data from a vehicle that represents the operational characteristics of the tires of the vehicle. The information may be automatically transmitted to an appropriate transceiver located at the gas station when the vehicle enters a preset perimeter of, or is a given distance from, the gas station. Thus, when the operator of the vehicle begins to pump gas or input air to the tires of his vehicle, he could readily view the operational characteristics, or the status, of the tires of his vehicle at a display that is mounted either at the gas pump, the handle of the gas hose, the housing of the air supply or some other convenient location at the gas station. In addition, the attendant at the gas station can view the operational characteristics of the tires of any of the vehicles parked at the gas station so that, if tire abnormalities are observed, the attendant could inform the operator of the vehicle that has the abnormal tire(s) that there is a potential problem. A permanent record of the operational characteristics of the tires of any of the vehicles may be printed out. Displays may also be incorporated to roadside signs/billboards so that passing motorists may readily ascertain from the displays the operational characteristics of the tires of their vehicles. Simple alert messages that apprize the motorists, either at the vehicle depot or passing the roadside sign/billboard displays, of whether attention needs to be directed to the tires of their vehicles may be displayed in place of the actual tire operational characteristics.

35 Claims, 3 Drawing Sheets

SYSTEM FOR DISPLAYING TIRE CHARACTERISTICS

CROSS REFERENCE TO RELATED APPLICATION

The instant application is related to co-pending application Ser. No. 09/603,996 filed Jun. 26, 2000 which is assigned to the same assignee as the instant application. The disclosure of the '996 application is incorporated by reference to the disclosure of the instant application.

FIELD OF THE INVENTION

The instant invention relates to the monitoring of the characteristics or parameters of the tires of a vehicle, and more particularly to such monitoring of the characteristics of the tires of a vehicle when the vehicle has stopped at a vehicle depot, such as for example a gas station or a garage, or is within a predetermined distance from a specially designed display system.

BACKGROUND OF THE INVENTION

As was disclosed in the aforenoted '996 application, the operational condition or characteristics of the tires of a vehicle is of the upmost import to the safety of the driver and passengers of the vehicle. Consequently, there is a need to determine, on a real time basis, the operational characteristics of the tires. In the invention of the '996 application, the operational characteristics of the tires of the vehicle may be gleaned by means of the cell phone or a PDA (personal digital assistant) carried by the operator. The instant invention focuses on another way in which the operational characteristics of the tires of the vehicle may be determined by the operator, or, with the permission of the operator, anyone else who is interested in the integrity of the tires of the vehicle.

In particular, the operator of a vehicle may be interested in the integrity of the tires of his automobile, or vehicle, when he has stopped at a gas station to fill up his vehicle with gas, or the tires of his vehicle with air. Given that after every fill up, a vehicle could conceivably go hundreds of miles (or kilometers) means that the operator of a vehicle, could conceivably not know the operational characteristics of the tires of his vehicle for an extended time.

If the operator of the vehicle were a practitioner of the invention described in the aforenoted incorporated by reference '996 application, he could readily check the operational characteristics of the tires of his vehicle when he wishes, or be notified of an abnormal condition of the tires when the parameters of the tires fall below an alarm condition, either preset by him or by default. However, in those instances where the operator of a vehicle does not carry a WAP (wireless application protocol) compliant PDA device, or the appropriate web based cell phone, he could very well not know that special attention needs to be paid to the tires of his vehicle until it is too late.

SUMMARY OF THE PRESENT INVENTION

To enable a driver of a vehicle to ascertain the integrity of the tires of his vehicle at the most opportune time, a depot where the vehicle is likely to stop such as for example a fuel depot or gas station, a bus depot or station, a taxi terminal or a truck terminal, is equipped with transceiver devices adaptable to receive signals from the vehicle that are representative of the integrity of the tires of the vehicle. As disclosed in the aforenoted '996 application, the tires of the vehicle are each equipped with an integrated system that has at least one sensor, a processing unit, a memory store, and a communications link for transmitting data that represents the operational parameters of the tire, as measured by the sensor, to a transceiver that is located in proximity thereof. In the aforenoted '996 application, the device used for receiving the transmitted signal from the tires may be a cell phone that is adaptable to operate under the Bluetooth protocol, or some other similar communications protocol. So, too, a transceiver may be provided in the vehicle itself so that signals received from the tires may be telecommunicationally relayed by the transceiver remotely to the user, possibly by way of the internet.

For the instant invention, in place of, or in addition to, the use of a cell phone as the means for informing the driver of a vehicle the operational characteristics of the tires of his vehicle, it is envisioned that a conventional vehicle depot, such as for example a gasoline station or a garage, be equipped with the appropriate transceiver mechanisms that can receive the tire parameter signals output by the tires of a vehicle that is positioned nearby. At least one display may be provided at the vehicle depot to enable the operator of the vehicle, or an attendant at the depot, to observe the operational characteristics of the tires.

The display may be provided at the gas pump, for those cases where fuel is being pumped into the vehicle. Alternatively, the display may be integrated or coupled to the handle of the conduit, or hose, that conveys the fuel from the fuel pump to the vehicle. Furthermore, instead of being provided at the gas pump proper or the gas nozzle handle, a larger display may be provided somewhere near the gas pumps of the fuel depot to enable the user to readily observe the operational characteristics of the tires of his vehicle.

The display may also be provided at the air supply at the gas station for those operators who only want to inflate the tires of their vehicles. For convenience and also to provide a permanent record, appropriate transceiver means may be provided at the cashier's station so that the operational characteristics of the tires of an operator's vehicle may be printed on his receipt, when the operator pays for his fuel.

A display may also be provided at the cashier's station, as for example integrated to the cash register, so as to enable the cashier or an attendant of the vehicle depot to determine the integrity of the tires of any appropriately equipped vehicle that drives onto the fuel depot, thereby enabling the attendant at the fuel depot to forewarn an operator of an vehicle having suspect tires that potential remedial actions need to be taken for those tires. At full service stations where attendants stand ready to pump gas for the drivers, when those attendants have determined, either via direct viewing or informed by the cashier or attendant at the cashier's station where there is a central display, that the tires of the vehicles they are pumping gas into have low air pressure, they in turn will fill up the tires of those vehicles with the appropriate air pressure.

In those instances where the gas pumps are equipped to read credit cards and print out receipts, the operational characteristics of the tires may be printed out directly on the receipts output from those gas pumps, without the operator having to go to the cashier's station or kiosk.

To provide privacy to an operator, the communications system in the vehicle is provisioned with a switch that, when turned to the deactivate mode, prevents the system from transmitting any data to the transceivers at the vehicle depot, or anywhere else. On the other hand, by intentionally activating the switch, the operator can decide on if and when he wants to find out the operational characteristics of the tires on his vehicle.

In place of a particular vehicle depot, the present invention may also be utilized for displays that may be posted along a road or highway, so as to enable a passing motorist to find out, if he wishes, the operational characteristics of the tires on his vehicle.

A main objective of the present invention is therefore to enable an operator of a vehicle to ascertain at a depot where he regularly parks his vehicle, or drives his vehicle to, to monitor the integrity of the tires of his vehicle.

Another objective is to enable a driver to determine the operational characteristics of the tires on his vehicle as he drives his vehicle along a road.

Yet another objective of the present invention is to provide the means for an operator, or anyone who is interested in the integrity of the tires driven by the operator, to be informed of the operational characteristics of the tires during a time when the operator is most prone to stop and pay particular attention to his vehicle.

Still another objective of the present invention is to enable the operator of a vehicle, or anyone who is interested in the integrity of the tires of his vehicle, to determine the operational characteristics of the tires when the vehicle is stopped at a gas station for refueling, or a garage or other vehicle depot for inspection or maintenance/repair.

It is yet another objective of the present invention to provide a passive system for the operator of the vehicle to determine the integrity of the tires of his vehicle, only when the system is intentionally activated by the operator of the vehicle.

BRIEF DESCRIPTION OF THE FIGURES

The above-mentioned objectives and advantages of the present invention will become apparent and the invention itself will be best understood by reference to the following description of embodiments of the invention taken in conjunction with the accompanying drawings, wherein.

DETAILED DESCRIPTION OF THE INVENTION

Figure 1:
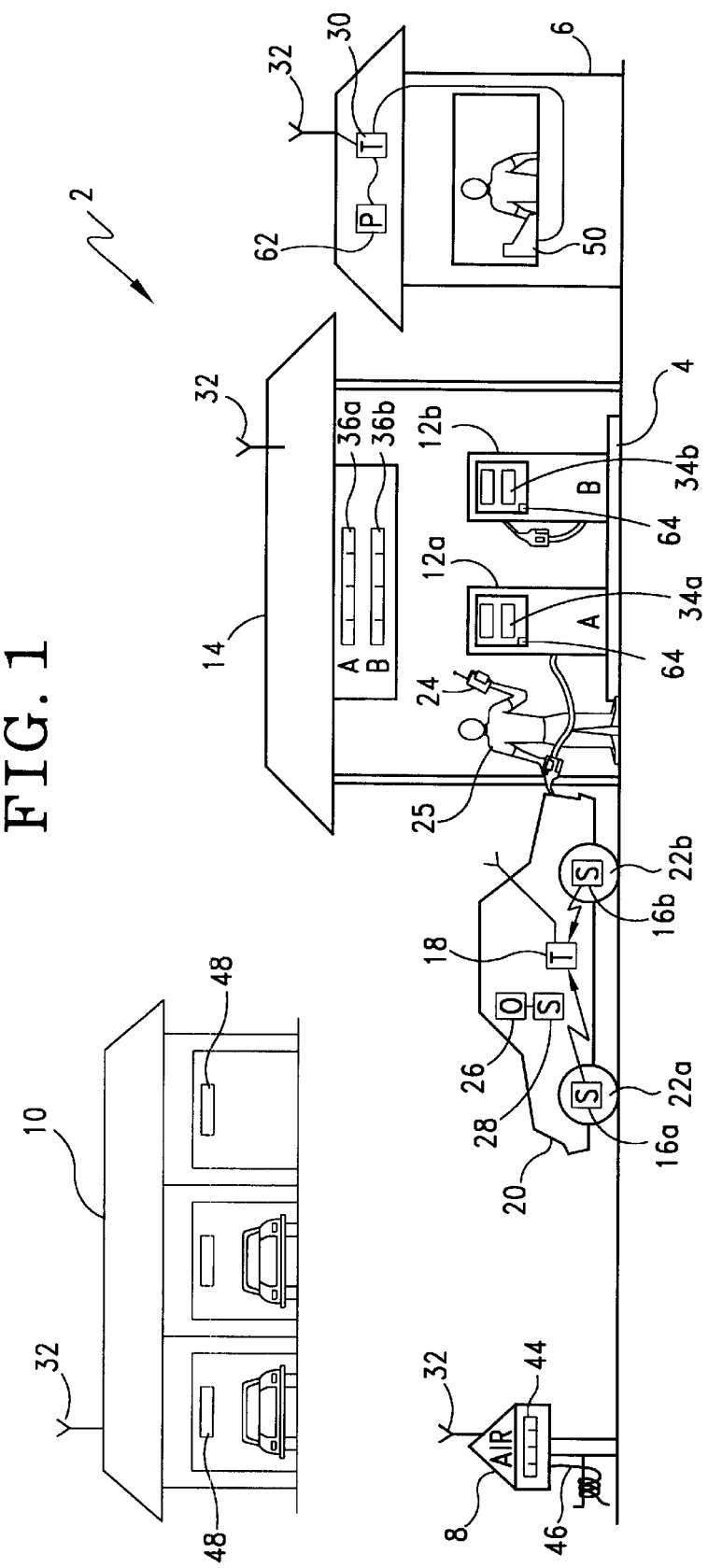
FIG. 1 is an illustration of a vehicle/fuel depot equipped to enable an operator of a vehicle, and/or the attendant of the depot, to readily determine the operational characteristics of the tires of his vehicle.

With reference to FIG. 1, a vehicle depot, such as for example a gasoline station 2, is shown to include at least one gas pump island 4 and an attendant kiosk or station 6. As is typical with gas stations, there is also an air supply 8 for those drivers who need to pump air into the tires of their vehicles. Also possibly associated with a gas station is a garage 10 whereat vehicle maintenance and repairs are done by car mechanics. On the gas pump island 4 there are a plurality of gas pumps 12. Usually each gas pump island is protected by a roof structure such as 14.

The aforenoted '996 application discloses a system for detecting and communicating the operational characteristics of the tires of a vehicle to the operator of the vehicle telecommunicationally. In brief, a system integrated to each tire of the vehicle includes sensor(s), a processing unit, a memory store, and a communications link. The system senses, processes, and sends the parameters detected by the sensors to a remote PDA device such as for example a web based cell phone. These systems are designated 16 for the tires of the vehicle shown in FIG. 1.

There is also disclosed in the '996 application a transceiver unit, such as 18 provided in the vehicle 20, for sending the signals detected from tires 22 of vehicle 20 telecommunicationally, for example via the internet, to a remote PDA device, such as cell phone 24 being held by a user or operator 25. For vehicle 20 shown in FIG. 1, there is also provided a display 26 that allows the driver to view the operational characteristics of tires 22 while he is in the vehicle. A switch 28 is further provided in vehicle 20. The purpose of switch 28 will be discussed, infra. The detailed description of the telecommunications system for vehicle 20, and its relationship to the operator, is given in detail in the aforenoted incorporated by reference '996 application.

The instant invention envisions the provision of means in places where vehicles would regularly stop, or along roadways where vehicles travel, so that the operational characteristics of the tires of any appropriately equipped vehicle could readily be ascertained by the operator of the vehicle, or by an attendant at those places where the vehicle regularly stops, so that any abnormalities to the tires are recognized. In the case that it is the operator who recognizes that abnormalities exist in the tires of his vehicle, he could take quick action by for example driving his vehicle to a garage, such as for example 10 shown in FIG. 1. On the other hand, if it is the attendant at the cashier kiosk who notices the tire abnormalities, then the attendant could notify the operator of such abnormalities, by way of the speakers that are conventionally provided at pump station 4.

Given that the transceiver system of the vehicle is operating under a protocol such as for example the Bluetooth protocol, vehicle 20 has to be positioned in proximity to the receiving units such as for example transceiver unit 30 at the cashier kiosk 6. Transceiver 18 of vehicle 20 could communicate with transceiver 30 when vehicle 20 is within a predetermined perimeter of, or a certain distance from, the gas station or vehicle depot 2. Antennas, such as 32, are provided throughout the vehicle depot so as to enable the various areas of the vehicle depot to receive signals being transmitted from vehicle 20, or tires 16 directly if those tires are equipped with their own transmitters.

To enable the operator to readily see the operational characteristics of the tires of his vehicle, display means, such as conventional LCD, LED or other equivalent displays, may be provided at any number of locations at the vehicle depot. For example, a display 34 may be provided at the gas pump itself. Appropriate transceivers may be provided at each of gas pumps 12 that enable those gas pumps to receive directly the tire parameter signals from vehicle 20. Alternatively, the tire parameter signals from vehicle 20 could be first received by transceiver 30, and then routed thereby to the gas pumps 12, either by telemetry or hardwired. Since the operational characteristics of the tires most likely would be represented as tire pressure, displays 34 would display the pressure of each of the tires of vehicle 20, either at the same time, if space permits, or in a rolling display format that sequentially displays the respective tire pressures of each of the tires. If characteristics of the tires other than tire pressure are received by the transceiver, then those other tire characteristics could also be shown on the display.

A switch may be provided in each of the gas pumps of the gas station so that the display on a particular gas pump would show the operational characteristics of the tires of the particular vehicle to which gas is being pumped. The switch may be activated by for example when the operator of the vehicle picks up the gas hose, or conduit, by its handle, and inserts the nozzle extending from the handle into the inlet of the gas tank of the vehicle. For the FIG. 1 embodiment, given that vehicle 20 is the closest to pump 12a, display 34 at pump 12a will display the tire pressure of the tires 22 of vehicle 20. To provide the operator of a vehicle a better view, displays 36 may be provided to an overhang from roof 14 of pump station 4. Thus, for the exemplar embodiment of FIG. 1, the operator of vehicle 20 only needs to look overhead to display 36a to view the operational characteristics of the tires of his vehicle.

For convenience, a digital display, such as a LCD display 38, may be provided directly onto the handle 40 of the gas hose or conduit 42, so that as the operator is pumping gas into his vehicle, he can continuously observe the various parameters of the tires of his vehicle. For the embodiment of FIG. 1, hose 42, handle 40 and nozzle 44 could all be referred to as the conduit means that conveys fuel from fuel pump 12.

Also located at vehicle or fuel depot 2 is an air supply 8. A display 44 may be provided at the air supply so that when the operator of the vehicle parks his vehicle next to the air supply 8, and begins to put air into the tires of his vehicle, he can ascertain on a real time basis the operational characteristics of the tires. Thus, by putting sufficient air into the tires of his vehicle, the operator of the vehicle could conceivably fix an alarm condition that was triggered when the tire pressure in one of the tires in his vehicle falls below a predetermined threshold. The air hose and the nozzle at the end of the air hose are designated as 46.

Displays 48 are also provided in garage 10 so that if maintenance or repair is being done on a vehicle, the operational characteristics of the tires of that vehicle may be displayed to both the driver of the vehicle and the car mechanic who is working on the vehicle. And if an abnormality of the tires is observed, such abnormality could readily be taken care of by the car mechanic.

In those instances where it is deemed either a good business practice or for safety reasons, a display may be provided to the attendant at the cashier's station 6 so that the attendant can readily view the operational characteristics of the tires of any of the appropriately equipped vehicles parked at the gas station. This display may be incorporated into the cash register 50, which receives its signal from transceiver 30.

Figure 3:
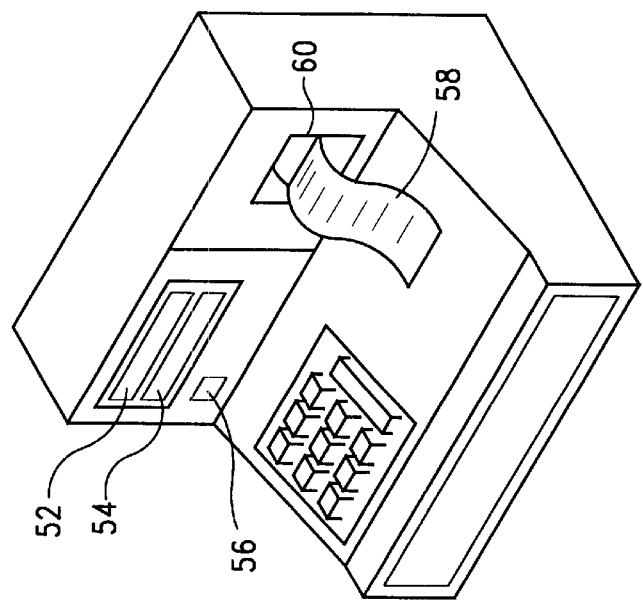
FIG. 3 shows a cash register that is provided with a display that enables an attendant at the vehicle depot to observe the operational characteristics of any vehicle that is parked at the depot and a printer attached to the cash register that prints out the operational characteristics of the tires of any vehicle onto a receipt, to be provided to the operator of the vehicle when the operator pays for the fuel.
Figure 2:
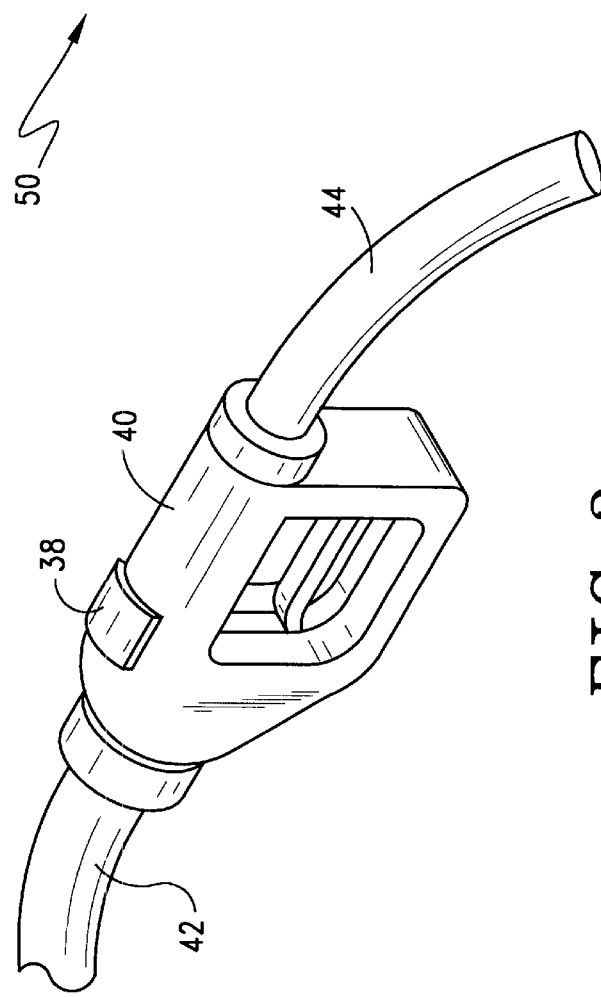
FIG. 2 shows the handle of a fuel hose that has provisioned thereon a display.

With reference to FIG. 3, cash register 50 is shown to include multiple displays 52 and 54, of which one is used for displaying the monies received from customers. The other display, for example 54, could be used for displaying the operational characteristics of the tires of a vehicle. A switch 56 is included in register 50 to allow the attendant to select whichever vehicle at the gas station whose tire characteristics that she wants to observe. This selection is subject to those vehicles that have their data transceivers activated to allow data from the vehicles to be transmitted, with or without any query from the transceiver at the depot. More on this selective activation later. And when a customer pays, the tire parameters may be printed onto a receipt 58 by means of a printer 60, so that the customer may have a permanent record of the operational characteristics of the tires of his vehicle for that particular time.

With respect to the exchange of information between vehicle depot 2 and vehicle 20, so long as the communications system at vehicle 20 has been activated, as mentioned previously, once vehicle 20 enters a preset perimeter of or reaches a given distance from depot 2, in response to an initiating prompt from processor 62 sent via transceiver 30, the tire parameter signals are received by transceiver 30 and displayed to the operator when the operator either begins to pump gas or input air to the tires of his vehicle. So, too, the display of the operational characteristics. of the tires of the vehicle may be provided at garage 10 or any place available at depot for convenient viewing by the customer.

In those instances where the operator of the vehicle does not want the operational characteristics of his tires to be viewed, for example by the attendant of the depot, a switch 28 is provided in vehicle 20 to allow the operator to shut off any transmission of signals to transceiver 30 of depot 2. On the other hand, if the operator of the vehicle does desire to send the tire parameter signals to depot 2 so that he could have for example a permanent record of the operational characteristics of the tires for that particular day, he could manually activate switch 28 to instruct transceiver 18 of vehicle 20 to transmit the data relating to the operational characteristics of the tires on that vehicle to transceiver 30 once a communications link is established between transmitter 18 and transceiver 30. There may further be the alternative whereby the signals from the tires of the vehicle continue to be sent to transceiver 30, with the signals being scrambled or encrypted, so that the operational characteristics or status of the tires would be displayed only after the driver of the vehicle has entered a predefined password or code.

When switch 28 is left in the on position, data relating to the tire characteristics of the vehicle is automatically transmitted to any transceiver tuned to receive such data when the vehicle comes within the reception range of the transceiver. For the convenience for the operator, a display 26 is provided inside vehicle 20 to allow the operator to view the operational characteristics of the tires of vehicle 20. Of course, this does not detract from the fact that the operator could continue to receive the tire parameter signals on his cell phone 24.

Thus, the operator of vehicle 20 has a number of options. He could activate switch 28 to the automatic mode to allow a processor such as for example processor 62 at kiosk 6 to begin the display of the operational characteristics of the tires of his vehicle when his vehicle, which is equipped with the means for determining the characteristics of the tires of the vehicle, establishes a communications path with transceiver 30, when the vehicle is within the reception range, or is a given distance from, vehicle depot 22. Alternatively, the operator could turn off his transceiver means, at least with respect to outputting data to transceiver 30, in those instances where he does not want the operational characteristics of the tires of his vehicle to be displayed at depot 2. Then again, if he wants, the operator of the vehicle could manually activate transceiver 18 by means of switch 28 so as to cause the tire parameter signals of his vehicle to be intentionally routed to transceiver 30, so that a permanent record of the operational characteristics of the tires of his vehicle could be printed out, either per the cash registers at kiosk 6, or by means of a built in printer such as 64 at pumps 12, if gas pumps 12 are equipped to accept credit card purchases and print out receipts, without the operator customer having to go to the attendant kiosk 6.

Figure 4:
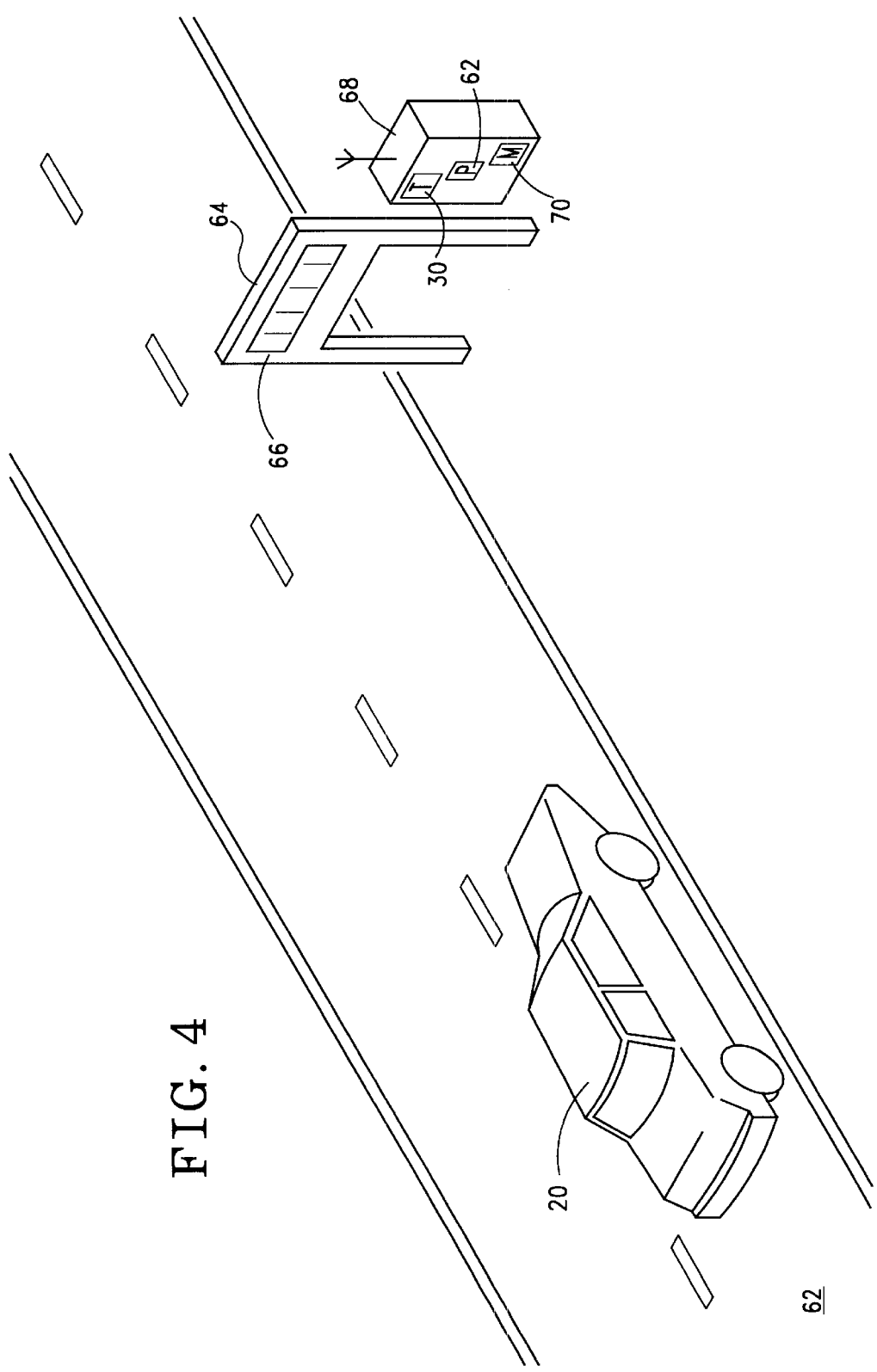
FIG. 4 is an illustration of a roadside display of the instant invention that enables a passing motorist to see the operational characteristics of the tires on his vehicle.

With reference to FIG. 4, vehicle 20 is shown to be driven by an operator along a road or highway 62. Along the side of the road there is provided a sign or billboard 64 that has integrated thereto a conventional highway display 66. Although not shown as such, billboard 64 is connected, by telemetry or hardwire, to a housing structure 68, which has stored therein a transceiver such as 30 and a processor such as 62 shown in FIG. 1. In addition, there is a monitor means such as for example a radar or a conventional distance gauge device 70 that can determine, within a preset perimeter of housing structure 68 or billboard display 66, the approach of vehicles, particularly those that are equipped with the communications system of vehicle 20.

For a vehicle that is appropriately equipped and whose communication system has been activated by the operator of the vehicle, when that vehicle reaches a given distance from transceiver 30, and therefor display 66, a request is sent out by transceiver 30 to the vehicle to prompt the vehicle to send out a signal containing data that is representative of the operation characteristics of the tires of the vehicle. Once the tire perimeter signal is received by transceiver 30, processor 62 will route that signal, after the appropriate modulation and configuration, to display 66. The information shown on display 66 is readily viewed by the operator of vehicle 20, and in fact could be viewed from a distance so that the respective operational characteristics of the different tires of the vehicle may be viewed in a rolling fashion on display 66.

If there are a number of vehicles traversing along the same stretch of road and each of those vehicles is appropriately equipped and is within the perimeter of transceiver 30, then the respective signals received from all of those vehicles will be timed so as to be shown on display 66 at the most appropriate time and distance for viewing by the respective operators of those vehicles. In any event, instead of showing the operational characteristics of the tires of each passing vehicle, the display could show only the status of the tires, i.e. displaying a message that the air pressure of the tires are OK. To ensure that the tire status messages would not confuse the passing motorists, as to which message corresponds to which vehicle, an identification tag may be embedded in the signals sent to the display from each of the vehicles, so that each tire status message displayed also includes an identification, such as for example the license plate number or the registration number of the vehicle.

It should be appreciated that instead of a single display per sign, a number of displays may be positioned in sequence, with each of the displays showing the operational characteristics of a particular one of the tires of the vehicle, so that the operator of a vehicle can readily ascertain the integrity of all of the tires of his vehicle. Instead of sequentially placed, the displays could very well be placed on the same billboard and arrange in the same manner as the tires on a vehicle, i.e., driver front, passenger front, driver rear and passenger rear, so as to provide a single view of the operational characteristics of all of the tires of a vehicle on a single billboard. Instead of a billboard, a panel or other similar supporting structure could be used to mount the multiple displays.

So far, the display, either at the various locations of a vehicle depot or at a roadside billboard, is disclosed to be displaying the operational characteristics of the tires of a vehicle. In practice, instead of showing the operational characteristics of the tires such as for example the air pressure of the respective tires of the vehicle, for those instances where such detailed information is not necessary, the display need only to show to the viewer data or information relating to the operational characteristics of the vehicle such as for example whether attention needs to be directed to the tires. In other words, for the tire operational characteristics of air pressure, information messages such as for example "Tire Pressure OK", "Tire Pressure Alert", "Tire Pressure Too High" or "Tire Pressure Too Low" may only need to be displayed.

In order that these tire operational characteristics related information messages would have relevancy with respect to individual vehicles, as for example when many vehicles are driven past a roadside billboard, the drivers of the vehicles each have to preset the base air pressure and the variance from this base air pressure that he or she wants to be monitored. Thus, if the driver were to have set the tires of her vehicle to a base line of 30 psi with variance of +/−2 lbs, then any time that the tire pressure in any of the tires in her vehicle is either higher than 32 psi or lower than 28 psi would cause the display to show the "Tire Pressure Alert" message, or the respective "Tire Pressure Too High" and "Tire Pressure Too Low" messages, or any other similar information relating to the operational characteristics of the tires of her vehicle. Once the driver sees messages other than the "Tire Pressure OK" message, she would know that it is perhaps time that she drives her vehicle to a gas station so as to have the tires of her vehicle looked at.

The monitored operational characteristics, for example the air pressure, of the tires of the vehicle could readily be converted to a message by means of conventional electronic converter circuitries and a conventional trigger circuit such as for example a Schmitt trigger circuit that would initiate the transceiver located at the vehicle to transmit a signal that corresponds to a particular condition of the status of the tires to the transceiver at the display. For example, if the tire pressure of the tires of the vehicles were deemed to be above the variance of a preset value, such as for example over the aforenoted 32 psi, then the transmitter at the vehicle would send out a signal to the transceiver at the display so that either the message "Tire Pressure Alert" or "Tire Pressure Too High" be shown on the display.

The converter for converting the operational characteristics of tires could also be located at the site of the display. In those instances where each display site is equipped with a converter for converting the operational characteristics of the tires received from a vehicle to a simple message, then that converter should have the tire alert upper and lower limits set with enough over and under variances so as to be able to provide messages that are inclusive of most vehicles whose drivers had not preset any base psi and the upper and lower variances. For example, instead of setting a high alert limit at 32 psi, the converter at the display site may have its high alert limit set to 38 psi and its low alert limit set to 24 psi, so that tires that have air pressures that fall within those high and lower limits would receive a "Tire Pressure OK" message. Of course, some type of disclaimer should be provided at the display site to let the public know that the display only shows alert messages over and below the upper and lower preset limits, respectively, that may not comport with the desirable psi for the tires of each of the passing vehicles. Further, the preset air pressure limits at the display site is overridden by an incoming tire pressure signal, if that tire pressure signal originates from a vehicle whose occupant had preset a lower upper limit or a higher lower limit for the tires of her vehicle so that the converter at her vehicle would send out tire pressure alert messages which are representative of the status of the tires of her vehicle.

While a preferred embodiment of the present invention is disclosed herein for purposes of explanation, numerous changes, modifications, variations, substitutions, and equivalents in whole or in part, should now be apparent to those skilled in the art to which the invention pertains. Accordingly, it is intended that the invention be limited only by the spirit and scope of the hereto appended claims. For example, instead of a gas station that also has a car garage, the gas station could very well be a standalone gas station. On the other hand, the car garage could very well be a standalone garage that only repairs and maintains cars or other vehicles. In either case, displays may be provided to enable either the operator, the attendant or the car mechanic, or a combination of all three, to readily view the operational characteristics of the tires or messages reflecting the respective statuses of the tires of a particular vehicle. So, too, even though FIG. 4 shows a display being placed along the side of a road, it should be appreciated that such display may well be placed at any location to which a vehicle may approach, so long as it makes it advantageous for an operator of a vehicle to find out the integrity of the tires on his vehicle.

What is claimed is:

1. System comprising:
   a fuel depot to which a fuel consuming vehicle may be positioned to replenish its fuel store, said vehicle having a plurality of tires;
   sensor means for sensing the operational characteristics of the tires of said vehicle;
   communications means for transmitting the sensed operational characteristics of the tires to said fuel depots;
   display means viewable by a person located at said fuel depot for displaying the operational characteristics or information relating to the operational characteristics of the tires transmitted by said communications means.

2. System of claim 1, further comprising:
   conduit means extending from a fuel pump at said fuel depot, said conduit means matable with a fuel store of said vehicle for inputting fuel to said fuel store;
   wherein said display means is integrated to or coupled to said conduit means such that when said conduit means is being handled by a person, said person can readily view the operational characteristics of the tires of said vehicle on said display means.

3. System of claim 2, wherein said conduit means comprises a fuel pump hose coupled to said fuel pump; and
   wherein said display means comprises a digital display mounted to the handle of said fuel pump hose.

4. System of claim 1, wherein said display means is integrated or coupled to an area of said fuel depot that is readily viewable by a person handling said conduit means.

5. System of claim 1, further comprising:
   an air supply means provided at said fuel depot;
   wherein said display means or an other display means is provided at said air supply means to enable a person to view the operational characteristics of the tires mounted to said vehicle at said fuel depot.

6. System of claim 1, further comprising:
   transceiver means at said fuel depot for receiving data from vehicles located at said fuel depot;
   wherein said transceiver means receives from vehicles equipped with tire sensor means the operational characteristics of the tires of those vehicles.

7. System of claim 1, wherein said vehicle has mounted thereto an other display means to enable a person to view the operational characteristics or information relating to the operational characteristics of the tires of said vehicle.

8. System of claim 1, wherein said display means is provided on at least one fuel pump or the handle of a fuel pump hose extending from said fuel pump to enable a person pumping fuel to a vehicle to view from said display means the operational characteristics of the tires mounted to said vehicle.

9. System of claim 1, further comprising:
   printer means at said fuel depot for printing a receipt of the fuel purchase for said vehicle, said printer means further printing the operational characteristics of the tires of said vehicle on said receipt.

10. System of claim 1, wherein said communications means is mounted to said vehicle, said communications means receiving data relating to the operational characteristics of the tires of said vehicle from at least one of the tires, said communications means further transmitting the received data to either or both a mobile communications device and said display means at said fuel depot.

11. A vehicle comprising:
    a plurality of tires;
    means for monitoring the operational characteristics of said tires;
    communications means for transmitting the monitored operational characteristics of said tires to a transceiver means at a vehicle depot;
    wherein when said vehicle is determined to be at or sufficiently close to said vehicle depot, said communications means begins to communicate with said transceiver means so that the monitored tire characteristics of said tires are transmitted to said transceiver means, said transceiver means routing information relating to the operational characteristics of said tires to a display means at said vehicle depot.

12. Vehicle of claim 11, further comprising:
    a switch activable manually to effect said communications means to transmit data relating to the operational characteristics of said tires on said vehicle to said transceiver means at said depot.

13. Vehicle of claim 11, wherein said communications means is further adaptable to transmit the operational characteristics of said tires to a mobile telecommunications device.

14. Vehicle of claim 11, further comprising:
    an other display means at said vehicle whereto the information relating to the operational characteristics of said tires could be transmitted for display.

15. Vehicle of claim 11, wherein said other display means comprises a visual display; and
    wherein said display means at said vehicle depot comprises at least one of a visual display and a printer for printing a receipt.

16. In a fuel station, apparatus comprising:
    at least one display;
    transceiver means communicatively connected to said display;
    means for initiating said display when a vehicle equipped with means for determining the characteristics of the tires on said vehicle establishes a communication path with said transceiver means or when fuel is being pumped from a fuel pump to said vehicle, said transceiver means receiving data representative of the operational characteristics of the tires on said vehicle from said vehicle, said data being routed to said display so that either the operational characteristics of the tires on said vehicle or whether attention needs to be directed to the tires on said vehicle may be shown on said display.

17. Apparatus of claim 16, wherein said initiating means begins its operation when said vehicle is within a given distance from said fuel pump or when it receives an activation signal from said vehicle.

18. Apparatus of claim 16, further comprising:
a fuel pump hose coupled to said fuel pump for inputting fuel to said vehicle;
wherein said display is situated on said fuel pump hose.

19. Apparatus of claim 16, further comprising:
printing means in communication with said transceiver means for receiving therefrom data representative of the operational characteristics of the tires of said vehicle, said printing means printing the received operational characteristics data on a receipt to be provided to the driver of said vehicle.

20. Apparatus of claim 16, further comprising:
air supply means for supplying air to the tires of vehicles;
wherein said display is mounted to said air supply means.

21. System for displaying the operational status of at least one tire of a vehicle when said vehicle moves proximate to a vehicle depot, comprising:
sensor means at or proximate to the tires of said vehicle for monitoring the operational status of the tires;
communications means at at least one of the tires and/or at said vehicle for transmitting data relating to the operational status of the tires;
at least one display located at said vehicle depot readily viewable by the driver of said vehicle and/or an attendant of said vehicle depot;
transceiver means at said vehicle depot for receiving the transmitted data of the operation al status of the tires from said communications means, said transceiver means relaying the received data to said display so that the data relating to the operational status of the tires of the vehicle is shown on said display.

22. System of claim 21, further comprising:
an other transceiver means provided in said vehicle;
wherein the data from said communications means is first transmitted to said other transceiver means located at said vehicle, said other transceiver means forwarding the data to said transceiver means at said fuel depot.

23. System of claim 21, wherein said vehicle depot comprises a gas station; and
wherein said system further comprises:
air supply means for supplying air to the tires of vehicles;
wherein said display is mounted to said air supply means.

24. System of claim 21, wherein said vehicle depot comprises a gas station having at least one fuel pump, said system further comprising:
a fuel pump hose to supply fuel from a fuel pump to said vehicle;
wherein said display is provided on said fuel pump hose.

25. System of claim 24, wherein said display on said fuel pump hose begins to display the information of the tires when a user either removes said fuel pump hose from said fuel pump or begins to pump fuel to said vehicle.

26. System of claim 21, wherein said vehicle depot comprises a gas station having at least one fuel pump; and
wherein said display is located on said fuel pump and is adaptable to display at least the operational status of the tires on the vehicle or the amount of fuel and the cost of fuel pumped into said vehicle.

27. System of claim 21, further comprising:
printer means for printing the operational status of the tires on a paper.

28. In combination,
a vehicle comprising
sensor means at or proximate to the tires of said vehicle for monitoring the operational characteristics of the tires; and
communications means at at least one of the tires and/or at said vehicle for transmitting data relating to the operational characteristics of the tires;
at least one display means located away from said vehicle;
transceiver means for receiving the transmitted data of the operational characteristics of the tires from said communications means, said transceiver means relaying the received data to said display means so that either the operational characteristics of the tires or data relating to the operational characteristics of the tires of the vehicle is shown on said display means and be viewable by at least the operator of said vehicle when said vehicle is within a predetermined distance from said display means.

29. Combination of claim 28, wherein said display means is located along the side of a road.

30. Combination of claim 29, wherein said display means is mounted to a panel; and wherein said panel has mounted thereon a plurality of displays each showing the operational characteristics of one of the tires of said vehicle.

31. Combination of claim 28, wherein said vehicle further comprises means for initiating the transmission of data from said communications means to said transceiver means.

32. Combination of claim 28, further comprising monitor means to monitor the approach of vehicles that are equipped with communications means activated for transmitting data relating to the operational characteristics of the tires of the vehicles wherein the communications means are mounted, said monitor means further prompting said transceiver means to send out a query to an approaching vehicle to request that the operational characteristics of the tires of the vehicle be sent thereto for displaying on said display means.

33. Combination of claim 28, wherein said vehicle further comprises a switch to enable the operator of said vehicle to selectively activate or disable said communications means.

34. Combination of claim 28, wherein said vehicle further comprises another display means for displaying the operational characteristics of the tires of said vehicle.

35. Combination of claim 28, wherein said display means is located at a site to which said vehicle is within sufficient proximity to enable said transceiver means to receive data from said communications means of said vehicle.

* * * * *